(12) United States Patent
Tanaka et al.

(10) Patent No.: US 6,343,285 B1
(45) Date of Patent: Jan. 29, 2002

(54) ESTIMATION AND DESIGNING SUPPORTING APPARATUS

(75) Inventors: Toshiharu Tanaka, Niihama Ehime; Tadahide Fujita, saijo Ehime, both of (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/168,934

(22) Filed: Oct. 9, 1998

(30) Foreign Application Priority Data

Oct. 20, 1997 (JP) .............................................. 9-287430

(51) Int. Cl.[7] .............................................. G06F 17/60
(52) U.S. Cl. ........................ 705/400; 700/97; 700/106; 700/107; 703/1; 705/29
(58) Field of Search ............................ 700/90, 97, 106, 700/107; 705/28, 29, 400; 703/1, 2

(56) References Cited

U.S. PATENT DOCUMENTS

| | | | | |
|---|---|---|---|---|
| 5,109,337 A | * | 4/1992 | Ferriter et al. ............... | 364/401 |
| 5,249,120 A | * | 9/1993 | Foley .............................. | 705/1 |
| 5,255,207 A | * | 10/1993 | Cornwell ........................ | 703/1 |
| 5,307,260 A | * | 4/1994 | Watanabe et al. ............... | 703/2 |
| 5,357,439 A | * | 10/1994 | Matsuzaki et al. ............. | 700/96 |
| 5,655,087 A | * | 8/1997 | Hino et al. .................... | 705/29 |
| 5,745,880 A | * | 4/1998 | Strothmann .................... | 705/7 |
| 5,793,632 A | * | 8/1998 | Fad et al. .................... | 705/400 |
| 5,893,082 A | * | 4/1999 | McCormick ................. | 705/400 |
| 5,920,849 A | * | 7/1999 | Broughton et al. .......... | 705/400 |

FOREIGN PATENT DOCUMENTS

| | | | |
|---|---|---|---|
| JP | 05-189449 | * | 7/1993 |
| JP | 06-325110 | * | 11/1994 |
| JP | 08-161378 | * | 6/1996 |
| JP | 08-305735 | * | 11/1996 |
| JP | 09-160945 | * | 6/1997 |

OTHER PUBLICATIONS

"PS Industry Solutions To Sell Award–Winning Software To Ford Motor Company": PR Newswire, Apr. 17, 1998, p. 417FLF003.*

* cited by examiner

*Primary Examiner*—Edward R. Cosimano
(74) *Attorney, Agent, or Firm*—Arent Fox Kintner Plotkin & Kahn, PLLC

(57) ABSTRACT

An estimation and designing supporting apparatus has a component model's cost database which is used for calculating costs from the types and sizes of components, and a 3D-CAD assembly model database which is used for drawing three dimensional external appearance based on the types and sizes of the components and so on. The apparatus is installed with an estimation and designing supporting program for, when a specification is inputted, determining the types and sizes of components required for manufacturing an installation meeting a specification and calculating the external appearance plan to be displayed and the costs of the apparatus using each database.

6 Claims, 26 Drawing Sheets

FIG. 8

Welcome to Sumitomo "C-PLAN ActiveMenu"!

Customer

Company : [AL-Mfg. Co. Ltd]
Department : [Purchasing Dept]
Name : [Mr. J Can]
Title : [Manager]

Sumitomo

Name : [T. Tanaka]

[OK]

INDEX
Start
IC ABCD1245
Customer
Introduction
Material?
(unknown)
Qestions according
to Material

FIG. 10

Question 0   What is your Material?

HOT ROLLED STEEL
COLD ROLLED STEEL
STAINLESS STEEL
ALUMINUM
COPPER
OTHERS

INDEX
Start
ID: AB012345
Customer
Introduction
Material?
(unknown)
Questions according
to Material

Aluminum Question 4   Alloy Codes?

Can Body | Can End

Alloy Code (AISI) for Can Body

1***
3***
5***
7***

Select or input alloy codes (3***).
☑ 3004  ☑ 3104  ■ 3204
OK   Cancel

INDEX
Start
ID: ABC12345
Customer
Introduction
Material?
  Aluminum
Facility?
  (Question 1)
Products?
  (Question 2)
Product Mix?
  (Question 3)
Alloy Codes?
  (Question 4)
Strip Size?
  (Question 5)
Flatness?
  (Question 6)
Scope?
  (Question 7)
Operation?
  (Question 8)

FIG. 13

Aluminum Question 5 Strip Size?

Can Body | Can End

Strip Size for Can Body

Gauge  min. [0.35] mm ~ max [0.35] mm

Width : min. [600] mm ~ max [1500] mm

[Decide]

INDEX
Start
ID: AE-012345
Customer
Introduction
Material?
  Aluminum
Facility?
  (Question 1)
Products?
  (Question 2)
Product Mix?
  (Question 3)
Alloy Codes?
  (Question 4)
Strip Size?
  (Question 5)
Flatness?
  (Question 6)
Scope?
  (Question 7)
Operation?
  (Question 8)

FIG. 14

| INDEX |
|---|
| Start |
| ID AEC12345 |
| Customer |
| Introduction |
| Material? |
| Aluminum |
| Facility? |
| (Question 1) |
| Products? |
| (Question 2) |
| Product Mix? |
| (Question 3) |
| Alloy Codes? |
| (Question 4) |
| Strip Size? |
| (Question 5) |
| Flatness? |
| (Question 6) |
| Scope? |
| (Question 7) |
| Operation? |
| (Question 8) |

Aluminum Question 6   Strip Flatness?

Can Body  Can End

Strip Flatness for Can Body

| | Incoming Strip Steepness(I-unit) = | 100 | IU |
|---|---|---|---|
| after Levelling | Steepness(I-unit) : | 2 | IU |
| | Longitudinal Bow : | 10 | mm/m |
| | Cross Bow : | 5 | mm/m |

Decide ▼

Definition of flatness values

FIG. 15

| EstimationNo | ProductID | MixRatio | AlloyCode | MinGauge | MaxGauge | MinWidth | MaxWidth |
|---|---|---|---|---|---|---|---|
| 210 | 1 | 50 | 3*** | 0.25 | 0.35 | 600 | 1900 |
| 210 | 2 | 20 | 5*** | 0.22 | 0.28 | 600 | 1550 |
| 210 | 3 | 30 | 5*** | 0.22 | 0.35 | 600 | 1550 |
| 211 | 1 | 10 | 3004;3104 | 0.25 | 0.35 | 600 | 1900 |
| 211 | 2 | 10 | 3***;5052;5082 | 0.22 | 0.28 | 600 | 1550 |
| 211 | 3 | 80 | 5082;5182 | 0.22 | 0.35 | 600 | 1550 |
| 212 | 4 | 100 | 1100;1200 | 0.12 | 0.18 | 600 | 1250 |
| 213 | 1 | 30 | 3004;3104 | 0.25 | 0.35 | 600 | 1550 |
| 213 | 2 | 30 | 3*** | 0.22 | 0.28 | 600 | 1550 |
| 213 | 3 | 30 | 5182 | 0.22 | 0.35 | 600 | 1550 |
| 213 | 4 | 10 | 1*** | 0.07 | 0.20 | 600 | 1750 |

FIG. 16

| ProductID | ProductName | DEFAULT VALUE ||||| 
|---|---|---|---|---|---|---|
| | | AlloyCode | MinGauge | MaxGauge | MinWidth | MaxWidth |
| 1 | Can Body | 3*** | 0.25 | 0.35 | 600 | 1900 |
| 2 | Can End | 5*** | 0.22 | 0.28 | 600 | 1550 |
| 3 | Pull Tab | 5*** | 0.22 | 0.20 | 600 | 1550 |
| 4 | Fin | 1*** | 0.07 | 0.20 | 600 | 1750 |
| 5 | Lithgraphic Plate | 1*** | 0.20 | 1.00 | 600 | 1550 |
| 6 | Blind | 3***;5*** | 0.12 | 0.18 | 600 | 1250 |
| 7 | Building Materials | 3***;5*** | 0.20 | 1.00 | 600 | 1550 |
| 8 | Others | 1*** | 0.20 | 1.00 | 600 | 1550 |

FIG. 17

| ProductID | AlloyCodeID | AlloyCode | DefaultSelect |
|---|---|---|---|
| 1 | 1 | 3004 | TRUE |
| 1 | 2 | 3104 | TRUE |
| 1 | 3 | 3204 | FALSE |
| 2 | 1 | 5017 | FALSE |
| 2 | 2 | 5052 | TRUE |
| 2 | 3 | 5082 | TRUE |
| 2 | 4 | 5182 | TRUE |
| 2 | 5 | 5552 | FALSE |
| 3 | 1 | 5042 | FALSE |
| 3 | 2 | 5082 | TRUE |
| 3 | 3 | 5182 | TRUE |
| 4 | 1 | 1100 | TRUE |
| 4 | 2 | 1200 | TRUE |

FIG. 18

| ProductID | AlloyCode | MinYS | MaxYS |
|---|---|---|---|
| 1 | 3*** | 270 | 300 |
| 2 | 5*** | 300 | 450 |
| 3 | 5*** | 300 | 400 |
| 4 | 1*** | 50 | 200 |
| 5 | 1*** | 80 | 250 |
| 6 | 3*** | 300 | 450 |
| 7 | 5*** | 150 | 450 |
| 8 | 1*** | 100 | 250 |

FIG. 19

Aluminum Question 8   Operating Condition?

Maximum Line speed : [200] m/min

Acceleration rate : [10] m/min/sec

Tension in front of Entry Bridle : [20] kgf/mm²

Tension after Exit Bridle : [3.5] kgf/mm²

[Decide]

INDEX
Start
ID AE019945
Customer
Introduction
Material?
Aluminum
Facility?
(Question 1)
Products?
(Question 2)
Product Mix?
(Question 3)
Alloy Codes?
(Question 4)
Strip Size?
(Question 5)
Flatness?
(Question 6)
Scope?
(Question 7)
Operation?
(Question 8)

FIG. 25

| | STANDARD | OPTION | | | | | MEASUREMENT | | | |
|---|---|---|---|---|---|---|---|---|---|---|
| | | A | B | C | D | E | PARAMETER | STANDARD VALUE | STANDARD NUMBER | STANDARD VALUE |
| COMPONENT A111 | ○ | | | | | | A111D, A111F | 20, 1000 | 2 | 201 |
| COMPONENT A112 | | ○ | | | | | A112D, A112F | 30, 1000 | 2 | 305 |
| COMPONENT A121 | ○ | | | | | | A121D, A121F | 30, 1000 | 4 | 400 |
| COMPONENT A122 | | ○ | | | | | A122D, A122F | 40, 1000 | 4 | 452 |
| COMPONENT A131 | ○ | | | | | | A131D, A131F | 65, 120 | 18 | 546 |
| COMPONENT A132 | ○ | | | | | | A132D, A132F | 65, 250 | 6 | 114 |
| COMPONENT A133 | ○ | | | | | | A133W, A133N | 1450, 2 | 1 | 822 |
| COMPONENT A134 | ○ | | | | | | A134D | 25 | 18 | 75 |
| COMPONENT A135 | ○ | | | | | | A135D | 25 | 12 | 34 |
| COMPONENT A141 | ○ | | | | | | A141N | 2 | 2 | 57 |
| COMPONENT A142 | ○ | | | | | | A142N | 2 | 4 | 39 |
| COMPONENT A143 | ○ | | | | | | A143N | 2 | 4 | 65 |
| COMPONENT A144 | ○ | | | | | | A144D | 12 | 8 | 1 |
| COMPONENT A145 | ○ | | | | | | A145D | 16 | 4 | 1 |
| COMPONENT A146 | ○ | | | | | | A146D | 35 | 2 | 2 |
| COMPONENT A147 | ○ | | | | | | A147D | 15 | 4 | 17 |
| COMPONENT A148 | ○ | | | | | | A148D | 15 | 8 | 34 |
| COMPONENT A211 | ○ | | | | | | A211D, A211F | 50, 1000 | 1 | 607 |
| COMPONENT A212 | | | | ○ | | | A212L | 50 | 2 | 3 |
| COMPONENT A213 | | | | | ○ | | A213L | 70 | 1 | 2 |
| COMPONENT A221 | | | | | | ○ | A221D | 35 | 1 | 2 |
| COMPONENT A222 | | | ○ | ○ | | | A222D | 35 | 1 | 46 |
| COMPONENT A223 | | | | | ○ | | A223L | 20 | 1 | 46 |
| COMPONENT A224 | | | | | | | A224L | 10 | 2 | 3 |
| COMPONENT A225 | | | | | | ○ | A225W | 20 | 4 | 7 |
| COMPONENT A226 | | | | | | ○ | A226D | 30 | 1 | 2 |

SUBASSEMBLY A1:
- UNIT A11
- UNIT A12
- UNIT A13
- UNIT A14

SUBASSEMBLY A2:
- UNIT A21
- UNIT A22

ESTIMATION AND DESIGNING SUPPORTING APPARATUS

BACKGROUND OF THE INVENTION

1. Field of the Invention

The present invention relates to an estimation and designing supporting apparatus which estimates and designs an installation(system), such as an industrial machine for manufacturing metal parts a plant, and so on which is to be designed and manufactured individually in accordance with a required specification.

2. Description of the Related Art

Since an industrial machine for manufacturing metal parts, a plant and so on are designed and manufactured individually in accordance with its specification, design needs to be conducted to a certain extent based on a required specification in order to determine its price. For this reason, when receiving an inquiry from a customer, a manufacturer of the industrial machine or the like must take such steps as confirming a specification at the customer's site, then taking back the confirmed specification to its own office to design it to a certain extent for the estimation.

A customer in some cases designates a specification with allowances concerning the industrial machine and so on. In such cases, a price of a product may be extremely lowered just by changing the designated specification slightly. In such cases, reversely, the performance of a product may be far increased, although a price may be increased too, by a slight change of the specification. For these reasons, it is preferable to provide not only an estimation for an installation with a specification required by a customer but also estimations for an installation with specifications close to the customer's requirement. However, it do no more impose burden on the customer if estimations would be submitted for various specifications close to the specification required by the customer after confirming the specification, with the conventionally steps followed.

SUMMARY OF THE INVENTION

An object of the present invention is to provide an estimation and designing supporting apparatus with which an estimation for an installation to be designed and manufactured individually in accordance with a specification can be promptly submitted at the place where the specification is given.

In order to solve the object, the present invention provides an estimation and designing supporting apparatus for estimating an installation which is to be manufactured by combining various types of components which is required to be designed in accordance with a specification. The estimation and designing supporting apparatus is provided with specification acquiring means for acquiring a specification of the installation to be manufactured, designing means for determining the types and sizes of components required for manufacturing the installation which meets the specification acquired by the specification acquiring means, estimating means for, calculating the costs required for manufacturing the installation based on the types and sizes of components determined by the designing means, and cost outputting means for outputting the costs calculated by the estimating means. As explained above, the estimation and designing according to supporting apparatus the present invention has the function of calculating and outputting costs in accordance with a specification. For this reason, if the estimation and designing supporting apparatus an estimation and designing of the invention is used, an estimation of an installation according to the specification can be obtained without delay at the place where the specification is determined. Therefore, requirements of a customer can be satisfied precisely and quickly.

For realizing the estimation and designing supporting apparatus according to the present invention, it is desirable that standard cost data storing means for storing standard cost data used by the estimating means for calculating each cost of a plurality of components based on the sizes of the components is added and that the estimating means calculates the costs required for manufacturing the installation based on the types and sizes of the components determined by the designing means as well as the standard cost data stored in the standard cost data storing means. If such a structure is adopted, the estimation and designing supporting apparatus (especially the estimating means) can be realized relatively easily.

The estimation and designing supporting apparatus according to the present invention is preferable to have default data information storing means for storing default data information used for specifying a default data of specification item based on data of at least one specification item among a plurality of specification items consisting the specification. In this case, it is desirable that the specification acquiring means acquires the data of at least one specification item, while displaying a of screen for acquiring the data and has a determining means for determining default data of the specification item based on the data of already acquired and of at least one specification item and the default data information stored in the default data information storing means, and displaying means for displaying a screen for acquiring data by which the determination default data is updated. When such a structure is adopted, data volume that a user must input can be reduced. As a result, the estimation and designing supporting apparatus that can be easily operated is obtained.

Moreover, a converting means for converting specification item data that can be directly used by the designing means each time the data of the specification item is acquired by the specification acquiring means may be added. In this case, the designing means may determine the types and sizes of components required for manufacturing the installation meeting the specification acquired by the specification acquiring means based on the data converted by the converting means. If such a structure is adopted, since the volume that the designing means must process is reduced, an estimation and designing supporting apparatus which can operate in high speed can be obtained. Further, since the converting means functions burning a user confirms the contents of a screen for data acquisition, the operating speed of an estimation and designing supporting apparatus is never affected by the addition of the converting means.

The estimation and designing supporting apparatus according to the present invention may be, a shape data storing means for storing shape data representing a three-dimensional shape of each of a plurality of components, drawing means for drawing a three-dimensional external appearance of the installation of the estimation based on the types and sizes of components determined by the designing means and the shape data stored in the storing means, and external appearance outputting means for outputting the external appearance drawn by the drawing means.

In addition, the estimation and designing supporting apparatus according to the present invention may be realized as a stand alone apparatus or may be structured as to be able to conduct data transmission via communication lines. To describe it concretely, in order to conduct the data transmission via communication lines, the specification acquiring means may acquires a specification from a terminal connected thereto via a communication line and the cost outputting means may output the cost calculated by the estimating means. Further, the estimation and designing supporting apparatus with the drawing means maybe structured so that the above-mentioned specification acquiring means and the cost outputting means are adopted, and that the external appearance outputting means outputs the external appearance drawn by the drawing means to the terminal.

BRIEF DESCRIPTION OF THE DRAWINGS

The invention will be described below in detail with reference to the accompanying drawings, in which:

FIG. 8 shows a customer information inputting screen displayed by the estimation and designing supporting apparatus according to the first embodiment of the present invention;

FIG. 10 shows an alloy selection screen displayed by the estimation and designing supporting apparatus according to the first embodiment of the present invention;

FIG. 11 shows a product usage selection screen displayed by the estimation and designing supporting apparatus according to the first embodiment of the present invention;

FIG. 12 shows a material code selection screen displayed by the estimation and designing supporting apparatus according to the first embodiment of the present invention;

FIG. 13 shows a strip gauge and strip width setting screen displayed by the estimation and designing supporting apparatus according to the first embodiment of the present invention;

FIG. 14 shows a setting screen for quality guarantee value displayed by the estimation and designing supporting apparatus according to the first embodiment of the present invention;

FIG. 15 in a table showing an estimative conditions value database provided in the estimation and designing supporting apparatus according to the first embodiment of the present invention;

FIG. 16 shows a default value table provided in the estimation and designing supporting apparatus according to the first embodiment of the present invention;

FIG. 17 shows a default value selection table provided in the estimation and designing supporting apparatus according to the first embodiment of the present invention;

FIG. 18 shows a mechanical properties table prepared by the estimation and designing supporting apparatus according to the first embodiment of the present invention;

FIG. 19 shows an operating condition setting screen displayed by the estimation and designing supporting apparatus according to the first embodiment of the present invention;

FIG. 25 is a table showing a component model cost database provided in the estimation and designing supporting apparatus according to the first embodiment of the present invention;

DETAILED DESCRIPTION OF THE PREFERRED EMBODIMENT

Preferred embodiments of the present invention is now described in detail with reference to the accompanying drawings.

First Embodiment

Figure 1:
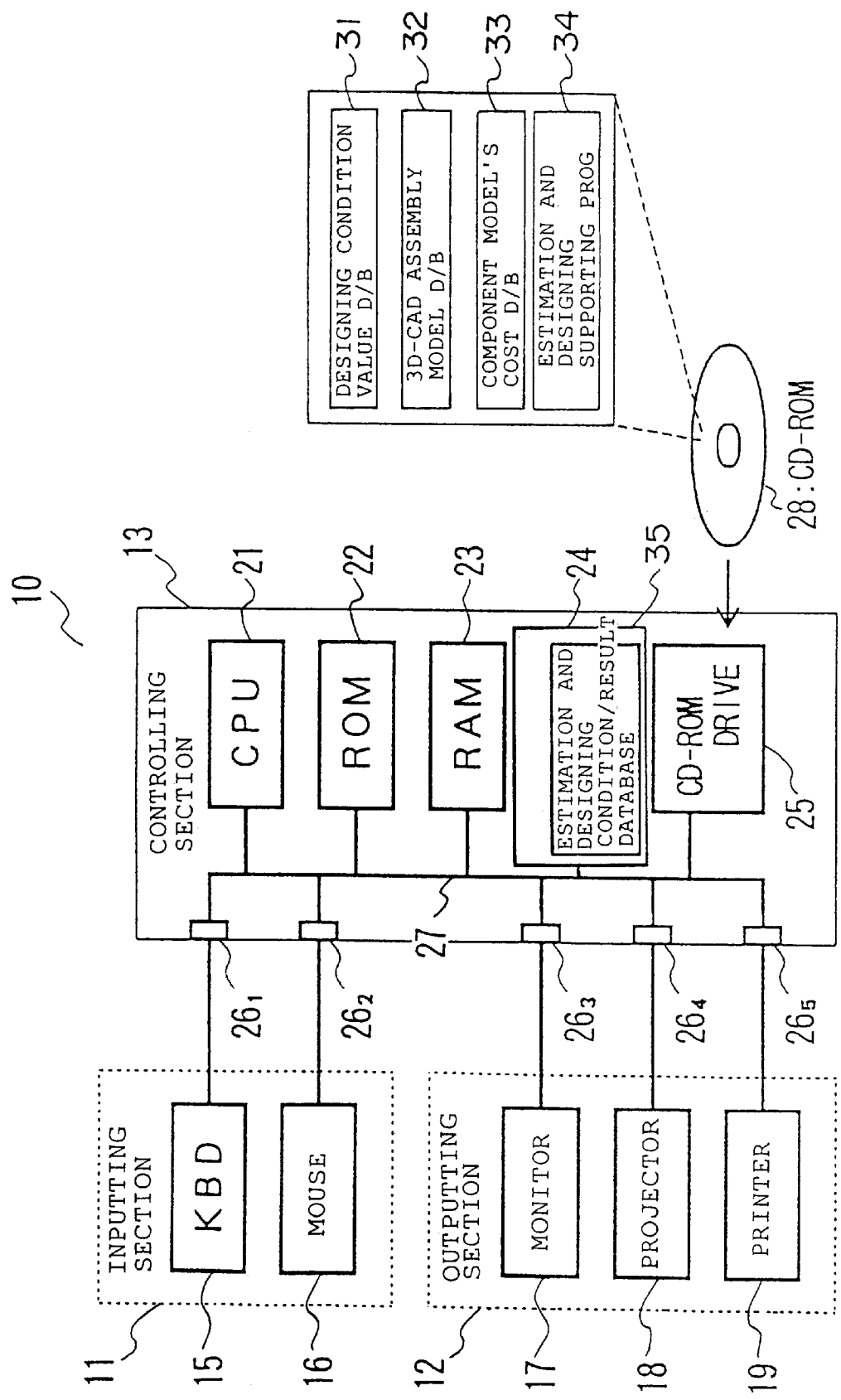
FIG. 1 is a block diagram showing the structure of an estimation and designing supporting apparatus according to a first embodiment of the present invention.

FIG. 1 shows a structure of an estimation and designing supporting apparatus according to a first embodiment of the present invention. The estimation and designing supporting apparatus of the first embodiment of the invention is exemplified as an apparatus for conducting estimation and designing of a tension leveller (metal thin plate leveling apparatus). The apparatus is structured on the premise that an employee of the company manufacturing such a tension leveller operates it.

As shown in the FIG. 1, an estimation and designing supporting apparatus 10 is provided with an inputting section 11, an outputting section 12 and a controlling section 13.

The inputting section 11 comprises a keyboard (KBD) 15 and a mouse 16. The outputting section 12 is comprised of a monitor 17, a projector 18 and a printer 19. The controlling section 13 comprises a CPU 21, a ROM 22, a RAM 23, a hard disc drive (HD DRIVE) 24 and a CD-ROM drive 25 as main elements. The controlling section 13 is also provided with various kinds of interface circuits $26_1, 26_2, 26_3, 26_4$ and $26_5$ connected to each device constituting the inputting section 11 and the outputting section 12. Each element within the controlling section 13 is connected to each other via a bus 27. Among the elements of the estimation and designing supporting apparatus, the elements within the controlling section 13 is controlled by the CPU 21 via the bus 27 and the elements outside the controlling section 13 are controlled by the CPU 21 via the bus 27 and the interface circuits $26_1, 26_2, 26_3, 26_4$ and $26_5$.

From a CD-ROM 28 storing a designing condition database (D/B) 31, 3D-CAD assembly model database 32, a component model's cost database 33, an estimation and designing supporting program (PROG) 34, various image data files (not shown) and so on, only the estimation and designing supporting program 34 or all the files including the estimation and designing supporting program 34 are installed into a hard disc in the hard disc drive 24 When only the estimation and designing supporting program 34 is installed, the estimation and designing supporting apparatus 10 is used in the state where the CD-ROM 28 is set in a CD-ROM drive 25. Further, the hard disc drive 24 is also used to store an estimation and designing conditions/results database 35 (details of which are hereinafter described) for retaining the conditions (specification) set to conduct an estimation and designing and the results of estimation. Further, the estimation and designing condition/result database 35 comprises an estimative conditions value database (see FIG. 15), a mechanical properties database (see FIG. 18) and so on.

Specifically, the estimation and designing supporting apparatus 10 of this embodiment is constructed as a portable computer provided with a liquid crystal display device as a monitor 17, a projector 18 and its interface card 264 and a printer 19. In this case, only the estimation and designing supporting program is installed in the hard disc drive 24.

The process (the control procedures performed for each section by the CPU 21) of the estimation and designing supporting apparatus 10 is hereinafter described in detail with reference to flow charts, displayed screens of the monitor 17 and so on. According to the estimation and designing supporting apparatus 10, since contents displayed on the monitor 17 and contents projected on a screen by the projector 18 are completely the same, explanation on the operation of the projector 18 is omitted hereunder.

Figure 2:
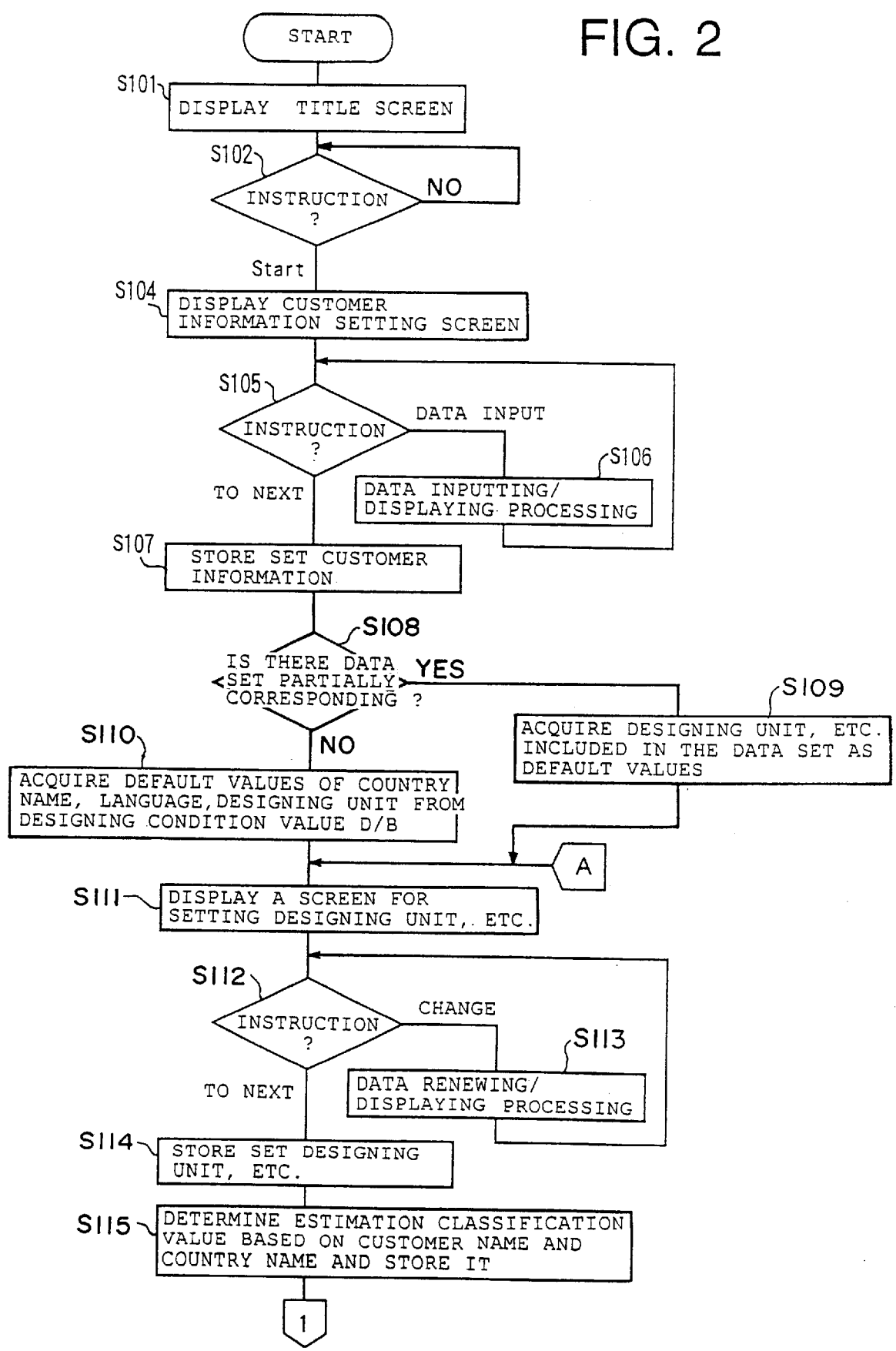
FIG. 2 is a flow chart showing the processes executed by the estimation and designing supporting apparatus according to the first embodiment of the present invention.

The processing for controlling each section executed by the CPU 21 in accordance with the estimation and designing supporting program 34 is shown in FIG. 2 through FIG. 6. As shown in FIG. 2, when the estimation and designing supporting program 34 is started up, the CPU 21 firstly controls each section so that a title screen is displayed on the monitor 17 (step S101). As described above, since the estimation and designing supporting apparatus is exemplified as an apparatus for conducting estimation and designing of a tension leveller, the CPU 21 displays a title screen as shown in FIG. 7 in this step.

After displaying a title screen, the CPU 21 waits for an instruction to be inputted by an operator (in other words, the CPU 21 waits for a predetermined signal inputted through a keyboard 15 or a mouse 16) (step S102). Then, when detecting that an instruction is inputted by the operator, the CPU 21 begins processing corresponding to the instruction. Specifically, when a button of the mouse 16 is clicked in the state where a mouse cursor is on the item of "Start" shown in the left side (also in the right side) of FIG. 7 or when an operation implying the instruction to select the item and to execute the same is conducted, the CPU 21 begins processing corresponding to the selected item ("Start" or "Intro").

When detecting that "Start" is selected (step S102; "Start"), the CPU 21 controls each section so that a customer information inputting screen is displayed on the monitor 17 (step S104). The customer information inputting screen is provided with columns in which information relating to a customer ("Company", "Department", etc.) and the name of an operator are inputted as shown in FIG. 8. After displaying the customer information inputting screen, the CPU 21 waits for an instruction to be inputted by an operator (step S105). When an instruction implying data's inputted (step S105; data input), the CPU 21 executes data input/display processing which is to deal with the instruction (step S106). For example, when an instruction implying character input via the keyboard 15 is inputted, the CUP 21 controls each section so that a character contained in the instruction is displayed at the position of a cursor. When an instruction implying the change (shift) of columns in which data is inputted via the keyboard 15 or the mouse 16 is inputted, the CPU 21 shifts the displayed position of a cursor into the column corresponding to the contents of the instruction. After executing the data input/display processing (step S106), the CPU 21 returns the processing to S105.

On the other hand, when detecting an instruction implying that the customer information is completed to be inputted in step S105 (step S105; to next), the CPU 21 stores customer information consisting of characters inputted before then (step S107).

The CPU 21 thereafter retrieves the estimation and designing condition/result database 35 and checks whether or not a data set of which part (for example, "Company", etc.) corresponds with customer information set displayed in the customer information setting screen is stored (step S108). In other words, the CPU 21 checks whether or not a set of customer data in respect of the same customer is stored. When a data set of which part corresponds with the customer information is stored, the CPU 21 acquires designing unit, etc. included in the data set as default values (step S109). On the contrary, when a data set of which part corresponds with the customer information is not stored, the CPU 21 acquires default values of a country name, language and designing unit by accessing the designing condition value database 31, etc. in the CD-ROM 28 (step S110).

Figure 9:
FIG. 9 shows a screen for setting designing unit, etc. displayed by the estimation and designing supporting apparatus according to the first embodiment of the present invention.

The CPU 21 then displays a screen for setting designing unit, etc. with each pieces of the acquired data (step S1ll). The screen for setting designing unit, etc. has an inputting and displaying column for country names, an inputting and displaying column for languages and an inputting and displaying column for designing unit as shown in FIG. 9. When executing the step S111 for the first time, the CPU 21 controls each section so that the screen for setting designing unit, etc. is displayed on the monitor 17 in the state where each default value acquired in step S109 or step S110 is displayed in corresponding inputting and displaying column.

The CPU 21 thereafter waits for an instruction to be inputted by an operator (step S112). When an instruction to change a country name, a language or a designing unit is inputted (step S112; change), processing returns to step S112 after data renewal/display processing is executed to change the instructed data (step S113). Specifically, when detecting that a button shown in the right side of each inputting and displaying column on the screen for setting designing unit, etc. (FIG. 9) is selected, the CPU 21 determines that the change is instructed. Then, in step S113, the CPU 21 displays below the selected inputting and displaying column a list of information which can be inputted (selected) in the same inputting and displaying column. When any one piece of information in the list is selected in the state where the list is displayed, the CPU 21 replaces the information in the inputting and displaying column with the selected piece of information, deletes the list and finishes the data renewal/ display processing.

On the other hand, when an instruction to execute the next processing is inputted (step S112; to next), the CPU 21 stores the information displayed in each inputting and displaying column on the screen for setting designing unit, etc. at the time as condition data used for estimation (step S114). In addition, the CPU 21 determines and stores estimation classification values corresponding to the set customer names and country names using a table stored in the CD-ROM 28, that is, a table in which estimation classification values defined as parameters of conversion ratio used for estimation are made to correspond to combinations of country names and customer names (step S115).

Figure 3:
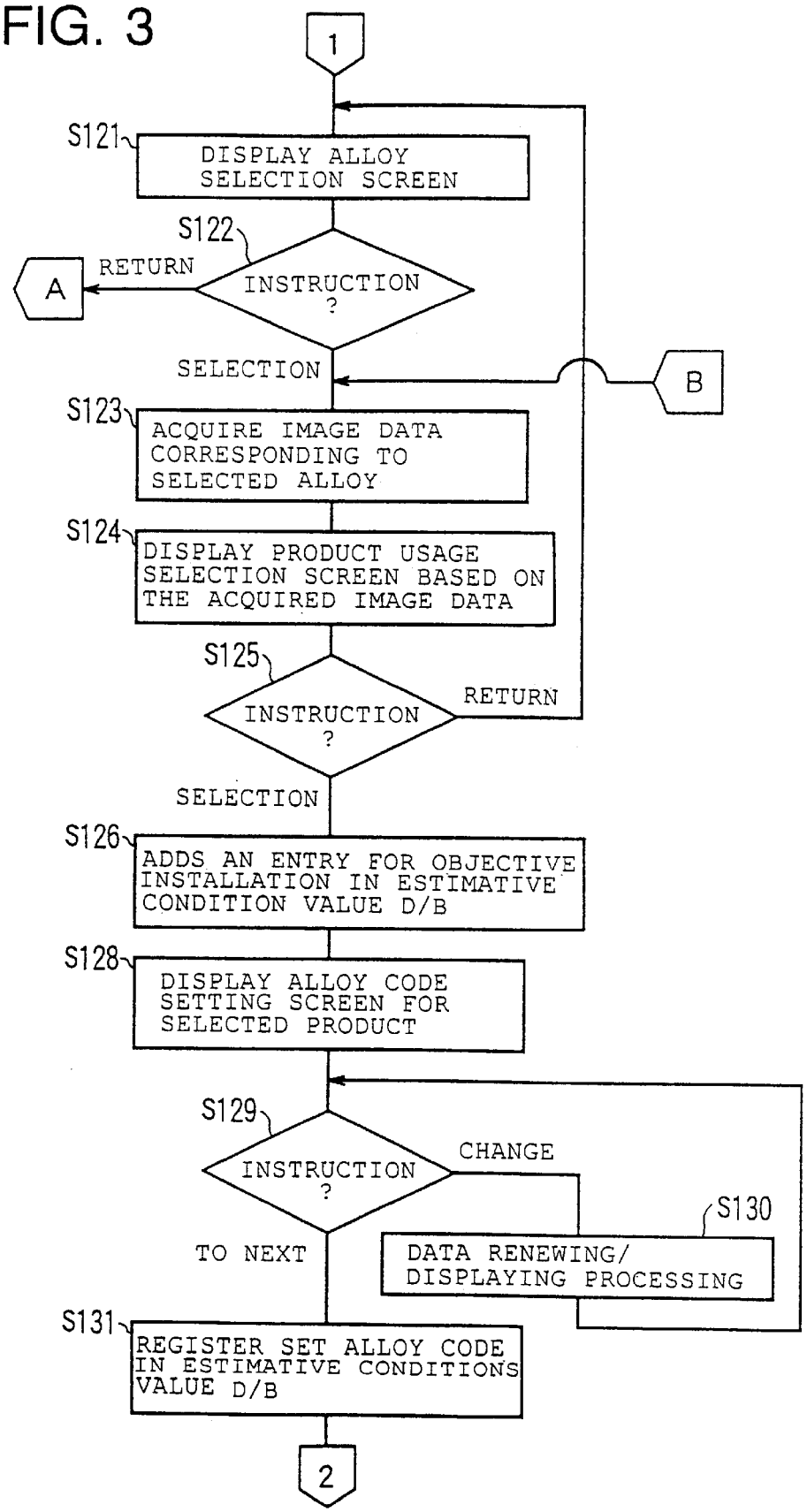
FIG. 3 is a flow chart showing the processes executed by the estimation and designing supporting apparatus according to the first embodiment of the present invention.

As shown in FIG. 3, the CPU 21 then executes processing for displaying the ally selection screen on the monitor 17 (Step S121). The alloy selection screen is the screen for selecting one alloy out of steel "STEEL", stainless steel "STAINLESS STEEL", aluminum "ALUMINUM", copper "COPPER" and other alloys "OTHERS", as shown FIG. 10.

The CPU 21 then waits for an instruction to be inputted by an operator (step S122). When instructed to return to the previous processing (step S122; return), the CPU 21 executes the processing from step Slll of FIG. 2.

Figure 11:
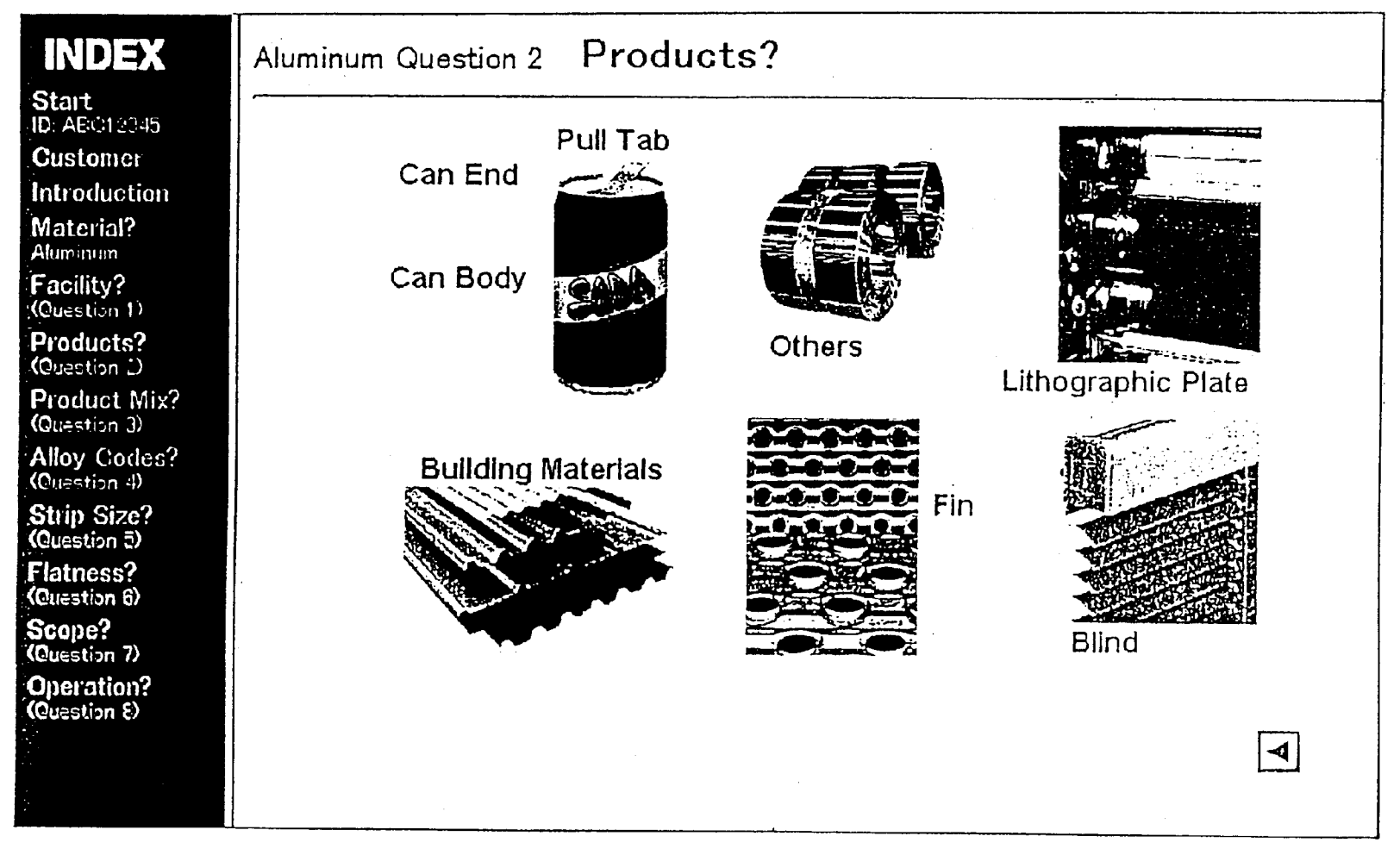

On the other hand, when an instruction to select any one of the alloys is inputted (step S122; select), the CPU 21 reads image data corresponding to the selected alloy from the CD-ROM 28 (step S123) and displays the product usage selection screen based on the read image data (step S124). For example, when aluminum is selected, the CPU 21 displays the product usage selection screen as shown in FIG. 11, that is, the screen for selecting one product out of "BUILDING MATERIALS", "PULL TAB", "CAN END", "CAN BODY", "Lithographic Plate", "BLIND", "FIN" and "OTHERS".

The CPU 21 thereafter waits for an instruction to be inputted by an operator (FIG. 3; step S125). When instructed to return to the previous processing (step S125; return), the CPU 21 executes the processing from step S121. On the other hand, when an instruction to select any one of the usage of product is inputted (step S125; select), the CPU 21 adds an entry for a tension leveler as object of estimation in the estimative conditions value database (see FIG. 15; details thereof is hereinafter described) included in the estimation and designing condition/result database 35 (step S126).

The CPU 21 then displays an alloy code setting screen for the selected usage of product (step S128). For example, when "CAN BODY" is selected in step S125, the CPU 21 displays a screen as shown in FIG. 12 as an alloy code setting screen.

The CPU 21 thereafter waits for an instruction to be inputted by an operator (FIG. 3; step S129). When instructed to change the alloy code (step S129; change), the CPU 21 returns processing to S129 after executing the processing for changing the displayed contents to one corresponding to the instruction (step S130). On the other hand, when instructed to proceed to the next processing (step S129; to next), the CPU 21 stores the set alloy code in the estimative conditions value database with the alloy code corresponded to an entry prepared in S126 (step S131). It is noted that, in this case, processing for calculating a parameter relating more directly to design (designing value) based on the set alloy code (specification) is also conducted. Since this type of processing (hereinafter referred to as the designing value acquiring processing) is conducted every time a new specification is determined, the designing value acquiring processing will be hereinafter described.

Figure 4:
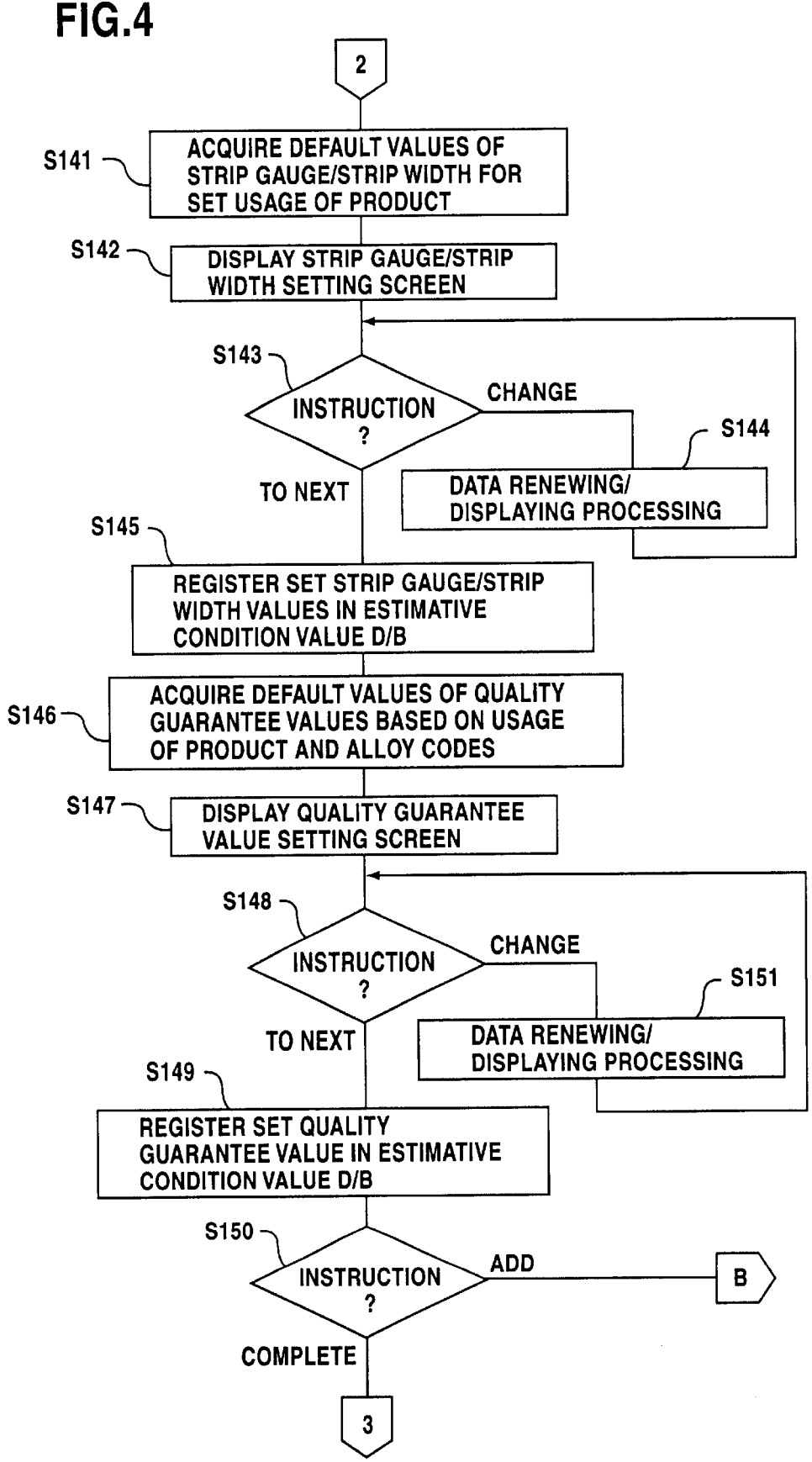
FIG. 4 is a flow chart showing the processes executed by the estimation and designing supporting apparatus according to the first embodiment of the present invention.

As shown in FIG. 4, after registering the set material code in the estimative conditions value database, the CPU 21 acquires default values of strip gauge and strip width stored in the designing condition value database 31 in correspondence with the set usage of produce (step S141), and displays a strip gauge and strip width setting screen to which strip gauge and strip width of plate as processing object is inputted (step S142). As shown in FIG. 13, on the strip gauge and strip width setting screen inputting and displaying columns for minimum value of a strip gauge, minimum value a strip width and maximum value of a strip width are provided. In step S142, the CPU 21 displays the strip gauge and strip width setting screen in the state where a default value acquired from the designing condition value database 31 is set (displayed) in each inputting and displaying column. Further, in the case where there is not a default value for minimum value of a strip gauge and so on (to be described hereinafter in detail), the CPU 21 displays the strip gauge and strip width setting screen in the state where each inputting and displaying column is left blank.

Thereafter, if instructed to change and set the strip gauge and strip width (step S143; change), the CPU 21 returns processing to S143 after executing the processing for changing the displayed contents to one corresponding to the instruction (step S144). On the other hand, when instruction to proceed to the next processing (step S143; to next) is inputted, the CPU 21 registers the set values of strip gauge and strip width in the estimative conditions value database (step S145).

The CPU 21 then acquires default values of the quality guarantee values stored in the designing condition value database 31, which are made to correspond to the selected usage of product and the set alloy code (step S146), and displays the quality guarantee value setting screen with the default values of the quality guarantee values (step S147). It is noted that the quality guarantee value setting screen through which "Steepness of Incoming Strip", "Steepness after Leveling", "Longitudinal Bow", "Cross Bow" and so on can be set as shown in FIG. 14.

After displaying the quality guarantee value setting screen, the CPU 21 waits for an instruction to be inputted by an operator (step S148). When instructed to change a quality guarantee value (step S148; change), the CPU 21 returns processing to S148 after executing the processing for changing the displayed contents to one correspond to the instruction (step S151) and waits for an instruction to be inputted by an operator again. On the other hand, when instructed to proceed to the next processing (step S148; to next), the CPU 21 registers the quality guarantee value shown on the display in the estimative conditions value database (step S149).

The CPU 21 thereafter waits for an instruction to be inputted by an operator (FIG. 4; step S150). When instructed to add a strip to be processed (step S150, add), the CPU 21 executes the processing from step S123 again.

The operation of the CPU 21 in steps S126 through S150 is now described in more detail with reference to FIG. 15 through FIG. 18. It is noted that FIG. 15 is a table showing the outline of the estimative conditions value database included in the estimation and designing condition/result database 35, and that FIG. 16 and FIG. 17 respectively shows outlines of a default value table for alloy code/strip gauge/strip width and a default value truth/fault selection table, which are included in the designing condition value database 31.

As shown in FIG. 15, the estimative conditions value database is stored with records each consisting of estimation number ("Estimation No"), usage of product ID ("Product ID"), alloy codes ("Alloy code"), strip gauge minimum values ("Min Gauge") and so on. In step S126, the CPU 21 defines an estimation number which is different from other estimation numbers in the estimative conditions value database and adds records in which only the defined estimation numbers and usage of product are set to the estimation and disigning conditions/results data base. Further, the CPU 21 adds information that makes the defined estimation number correspond to customer information and designing unit, etc., to other databases constituting the estimation and designing condition/result database 35.

As shown in FIG. 16, default values of alloy codes ("Alloy Code"), minimum values of strip gauge, maximum values, of strip width, minimum values of strip width and maximum values of and strip width are stored in the default value table for every usage of product(represented by "Product ID", "Product Name"). As shown in FIG. 17, the default value truth/fault selection table is structured so that the "Default Select" value can be specified based on combinations of usage of product and alloy codes (alloy code IDs). Alloy code IDs are information showing the position of alloy codes that can be selected, which are shown in the right side of FIG. 12.

The CPU 21 utilizes these tables as described below when displaying the strip gauge and strip width setting screen. As already described, when "CAN BODY" is selected in step S125 (FIG. 3), the CPU 21 displays a screen as shown in FIG. 12 as an alloy code setting screen, thereafter, displays a screen as shown in FIG. 13 as a strip gauge and strip width setting screen. In this course, the CPU 21 acquires the minimum value of the strip gauge, the maximum value of the strip gauge, the minimum value of the strip width and the maximum value of the strip width which are stored in the default value table, with made to correspond to the usage of product currently set as object of processing. Then, the CPU 21 displays the strip gauge and strip width setting screen in the state where each of the acquired values is set in the corresponding inputting and displaying columns respectively.

The designing value acquiring processing is now described. Detailed contents of the designing value acquiring processing are different depending on the set specification. For example, when the alloy code of a strip to be processed is determined, the CPU 21 executes the designing value acquiring processing with the contents as described below. More specifically, the CPU 21 firstly acquires mechanical properties (longitudinal elastic modules, yielding stress, tensile strength) corresponding to the alloy code from the designing condition value database 31. Then the CPU 21 stores (adds) the acquired mechanical properties in the mechanical properties table (see FIG. 18) included in the estimation and designing condition/result database 35 together with the alloy code and the usage of product. When completing the setting of the strip gauge and strip width on the strip gauge and strip width setting screen, the CPU 21 conducts processing for aquiring minimum/maximum values of the strip gauge and the strip width with respect to all the alloys set at the time and storing them in the mechanical properties table as the designing value acquiring processing.

When the setting of quality guarantee values through the quality guarantee value setting screen is completed, the CPU 21 conducts processing for aquiring a combination of the most strict conditions (the minimum value of steepness after leveling, the minimum value of longitudinal bow, the minimum value of cross bow and the minimum value of the level of surface scratch) out of all the quality guarantee values set at the time and storing the combination in the mechanical properties table as the designing value acquiring processing. Thus, the designing value acquiring processing is for acquiring in advance a parameter to be actually used in the estimation and designing program to be performed later.

Figure 5:
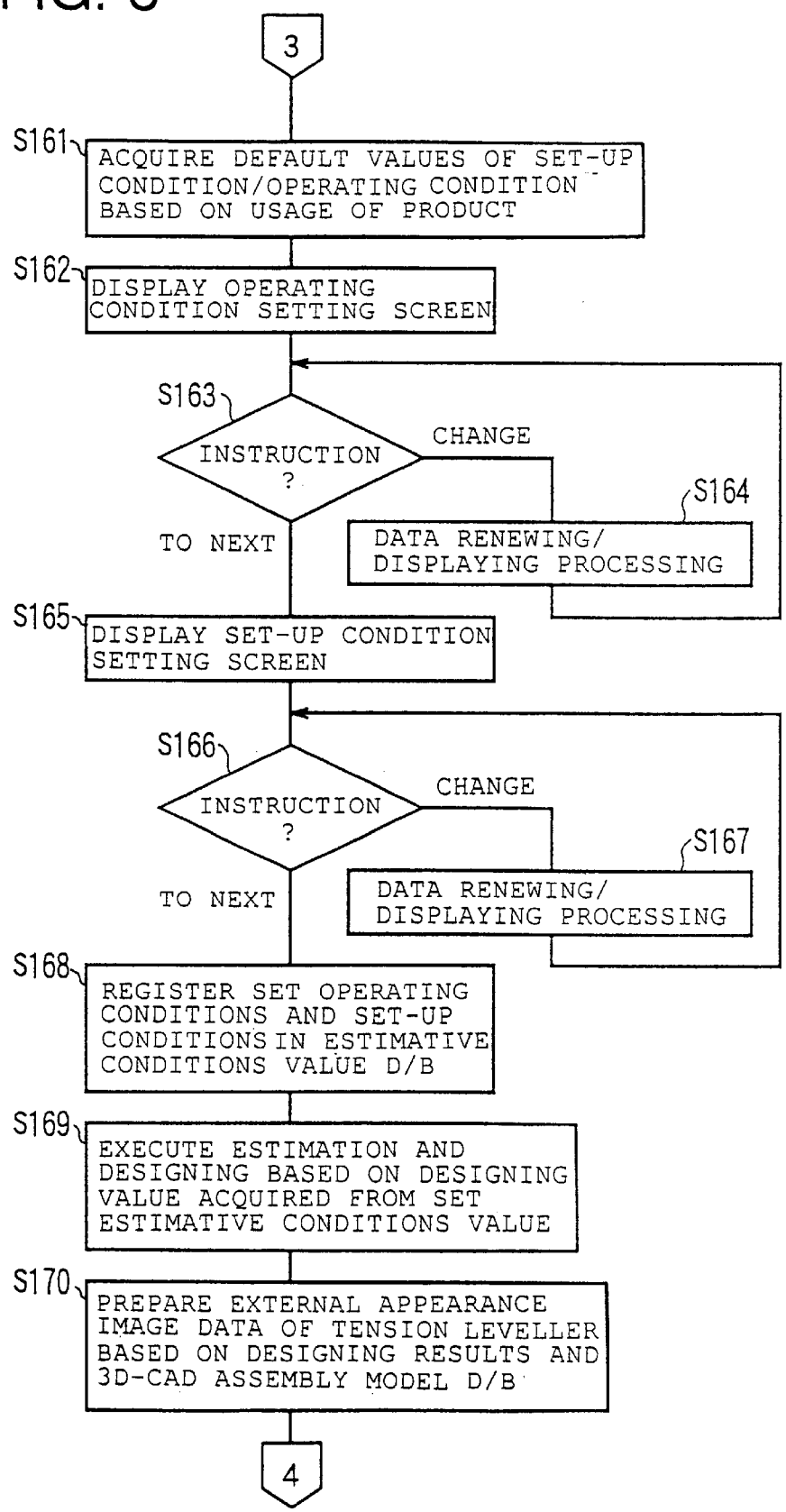
FIG. 5 is a flow chart showing the processes executed by the estimation and designing supporting apparatus according to the first embodiment of the present invention.

As shown in FIG. 5, the operation of the CPU 21 after instructed of completion of the setting of strips in step S150 of FIG. 4 is hereinafter described. When instructed of the completion (step S150; complete), the CPU 21 acquires default values of setting conditions and operating conditions from the designing condition value database 31 based on the set usage of product (step S161) and displays the operating condition setting screen (FIG. 19) with the default values (step S162). The CPU 21 then waits for an instruction to be inputted by an operator (step S163).

Figure 20:
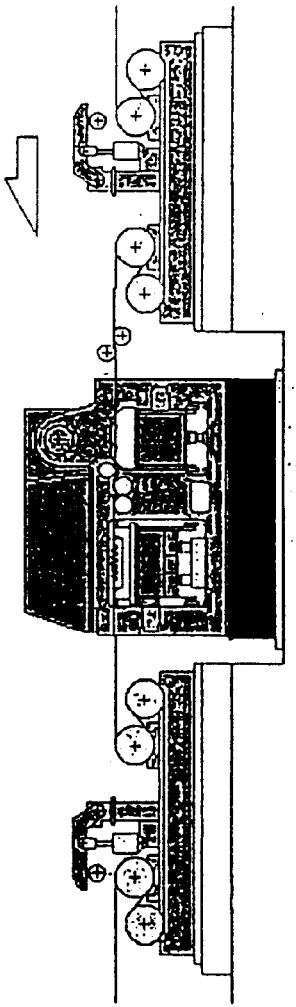
FIG. 20 shows a set-up condition setting screen displayed by the estimation and designing supporting apparatus according to the first embodiment of the present invention.

When instructed to change the operating conditions (step S163; change), the CPU 21 conducts the processing for changing the displayed contents to the instructed ones (step S164) and returns the processing to S163. On the other hand, when instructed to start the next processing (step S163; to next), the CPU 21 displays the set-up condition setting screen (FIG. 20) in the state where the default value acquired in step S161 is set in each column (step S165). The CPU 21 then waits for an instruction to be inputted by an operator (step S166).

When instructed to change the displayed contents (step S166; change), the CPU 21 changes the displayed contents in accordance with the instructed contents (step S167) and returns the processing to S166. On the other hand, when instructed to start the next processing (step S166; the next), the CPU 21 conducts the registration of the set operating conditions and set-up conditions into the estimative conditions value database (step S168).

Figure 21:
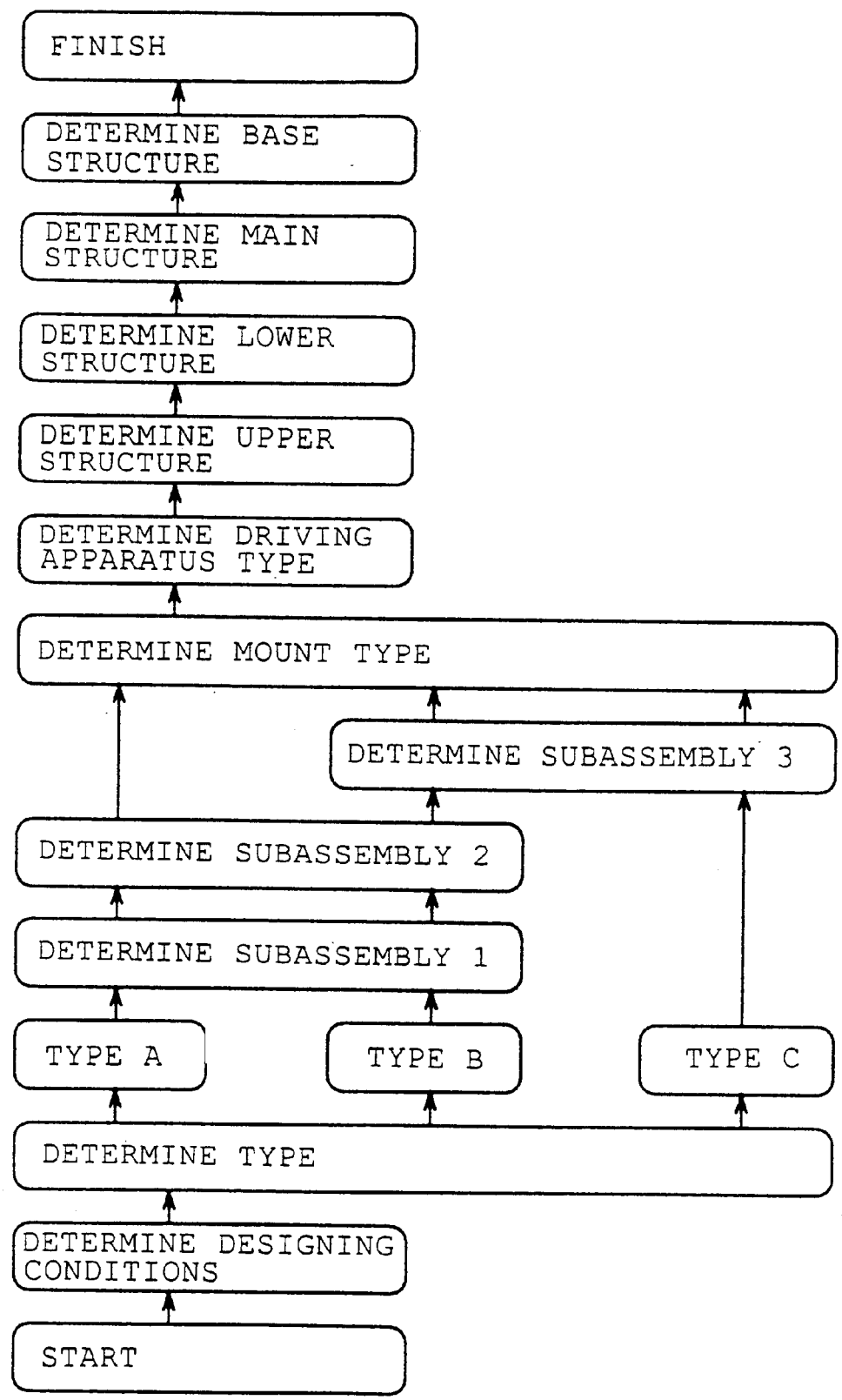
FIG. 21 is a flow chart of estimation and designing executed by the estimation and designing supporting apparatus according to the first embodiment of the present invention.
Figure 22:
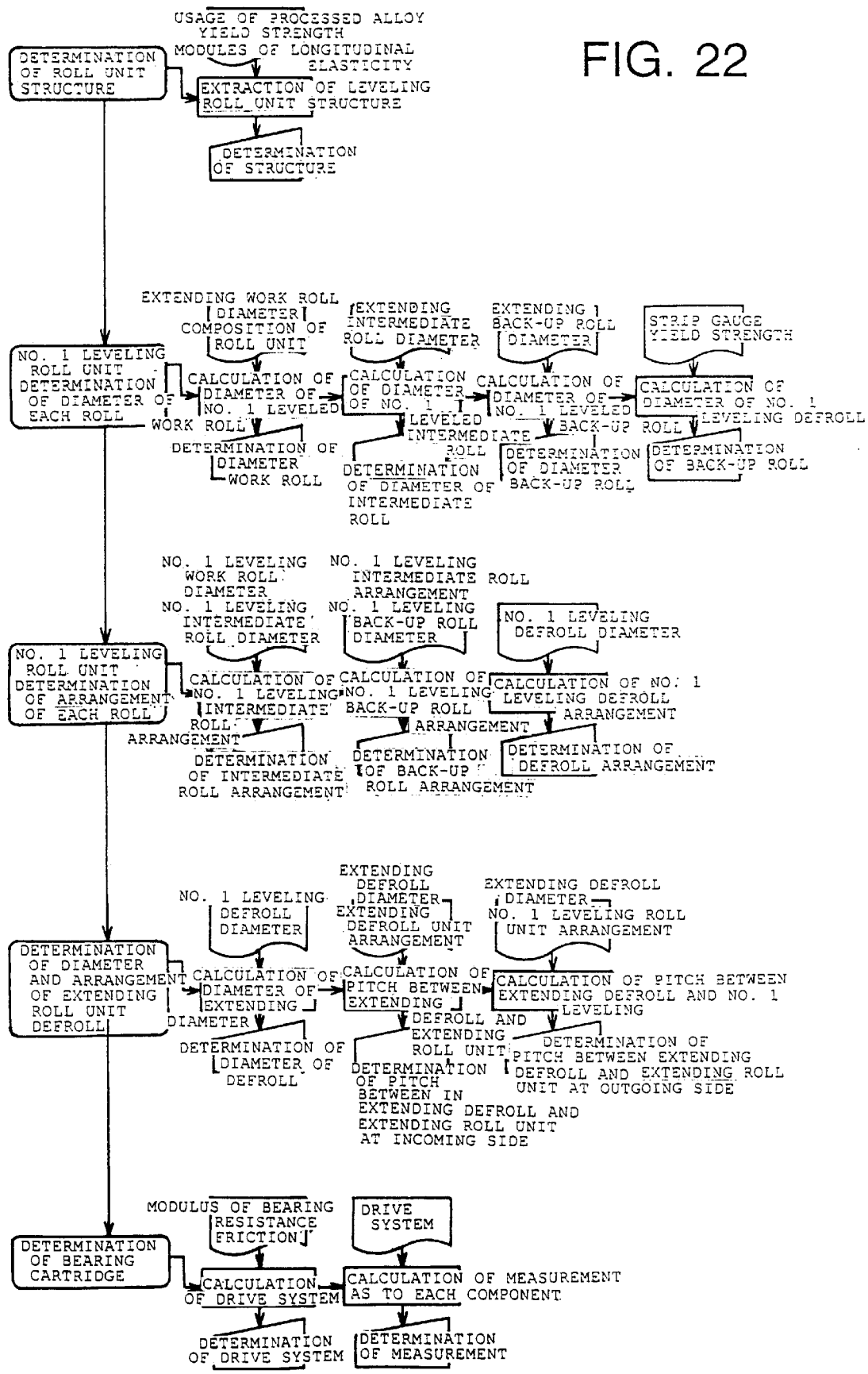
FIG. 22 is a flow chart showing procedures for designing a leveling roll unit by the estimation and designing supporting apparatus according to the first embodiment of the present invention.

The CPU 21 then conducts the estimation and designing of a tension leveller that can meet the required specification by using of the set estimative conditions value and the designing values acquired by the designing value acquiring processing (step S169). As shown in FIG. 21, the estimation and designing includes no-feedback processing and executed based on parameters having been determined to be used in the designing. For example, the designing procedures for estimating and designing each component of the leveled roll unit are shown in FIG. 22.

After completing the estimation and designing in S169, the CPU 21 creates image data of the external appearance of the tension leveller to be manufactured based on the acquired results of the estimation, that is, the parameter groups showing the types and sizes of components required for manufacturing the tension meeting the specification and a 3D-CAD assembly model database 32 in the CD-ROM 28 (FIG. 5; step S170).

Figure 6:
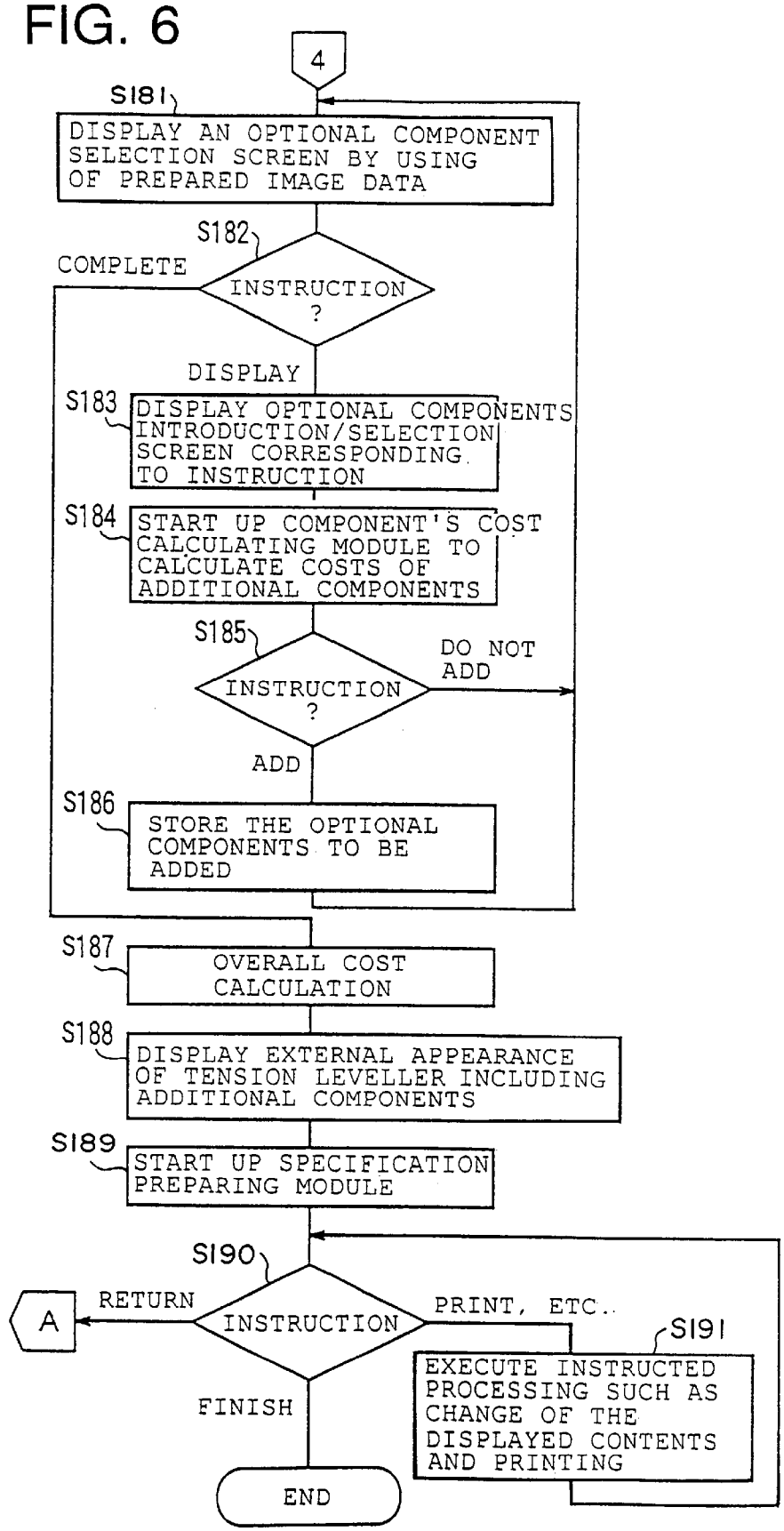
FIG. 6 is a flow chart showing the processes executed by the estimation and designing supporting apparatus according to the first embodiment of the present invention.
Figure 7:
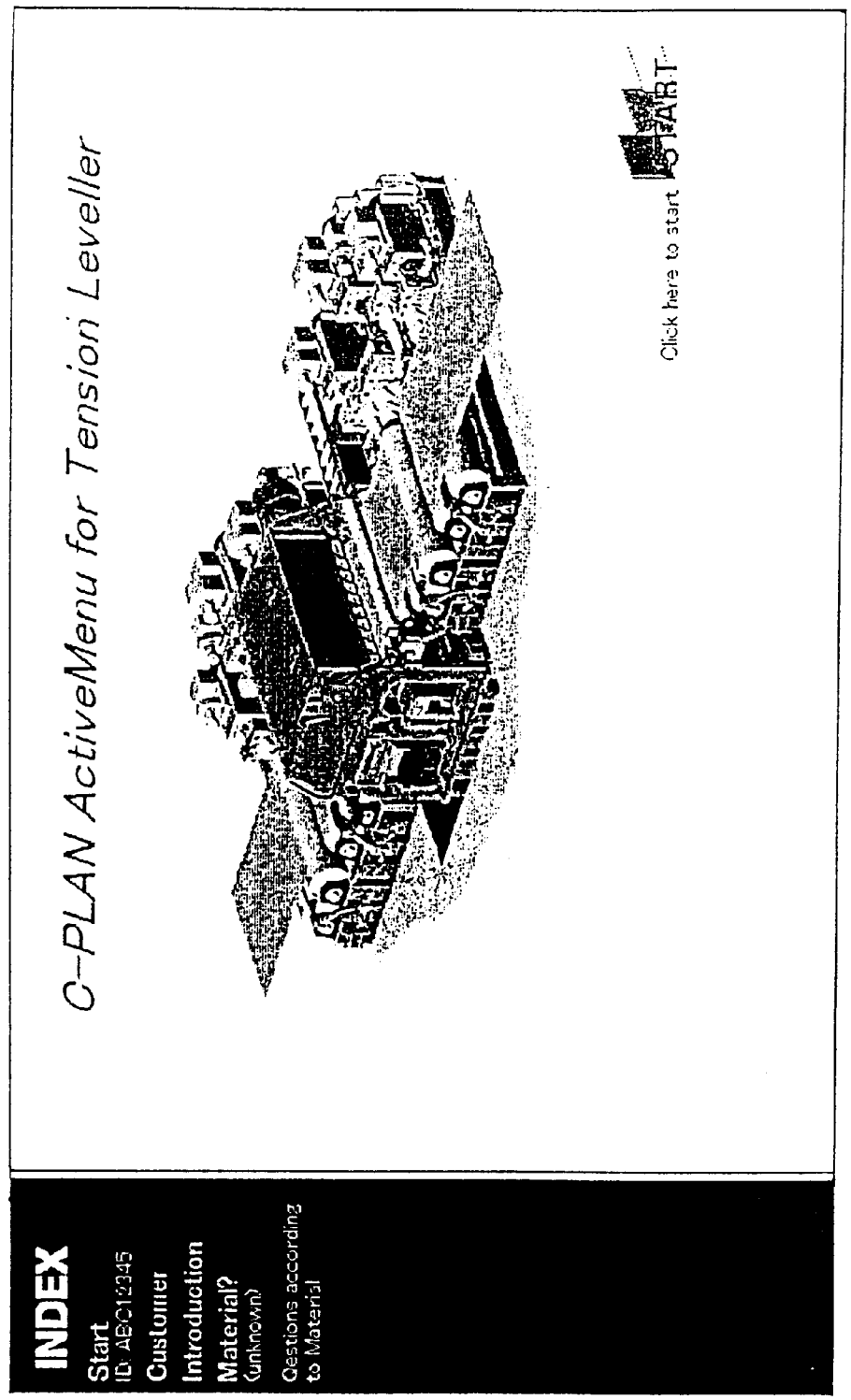
FIG. 7 shows a title screen displayed by the estimation and designing supporting apparatus according to the first embodiment of the present invention.
Figure 23:
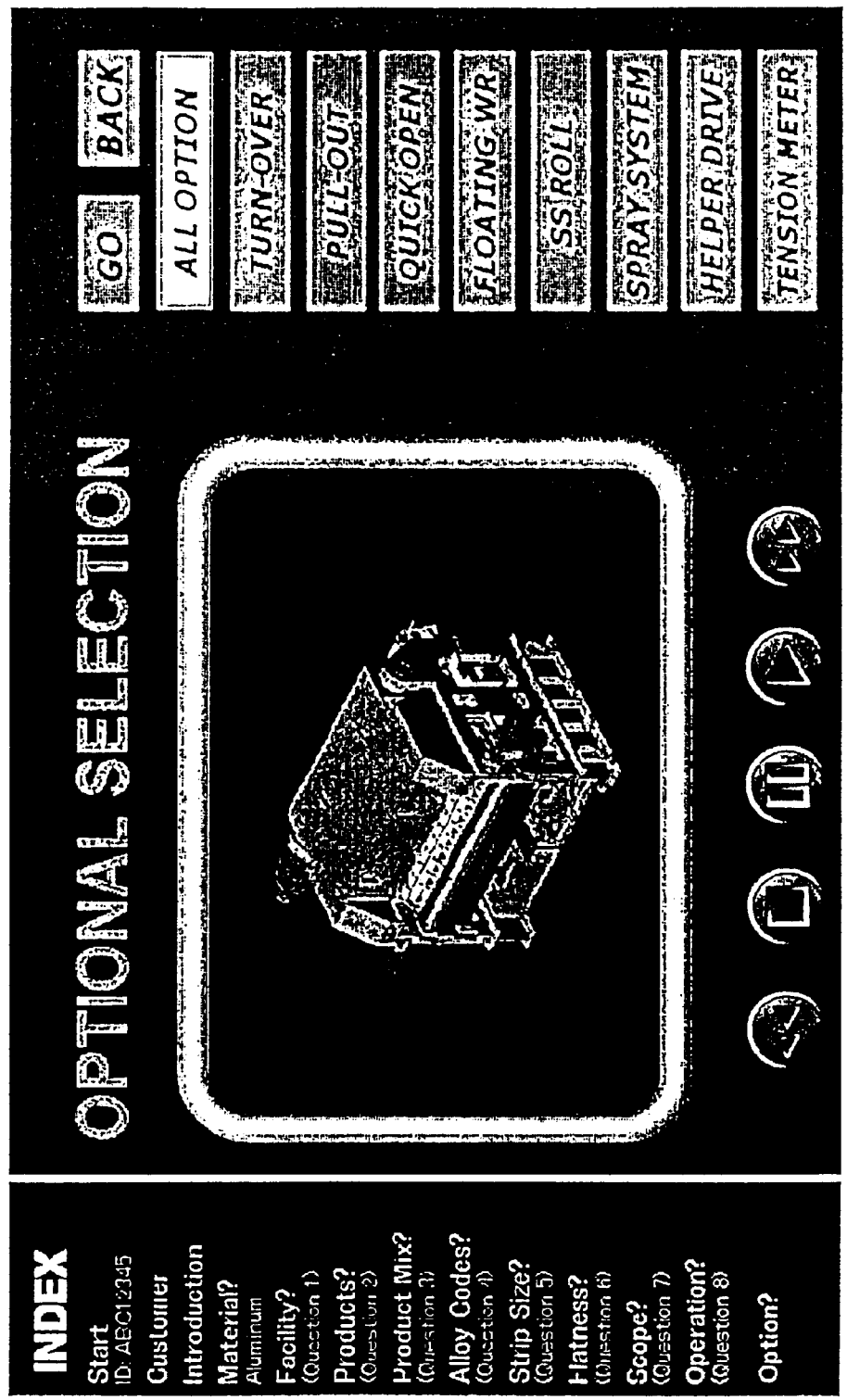
FIG. 23 shows an optional components selection screen displayed by the estimation and designing supporting apparatus according to the first embodiment of the present invention.
Figure 24:
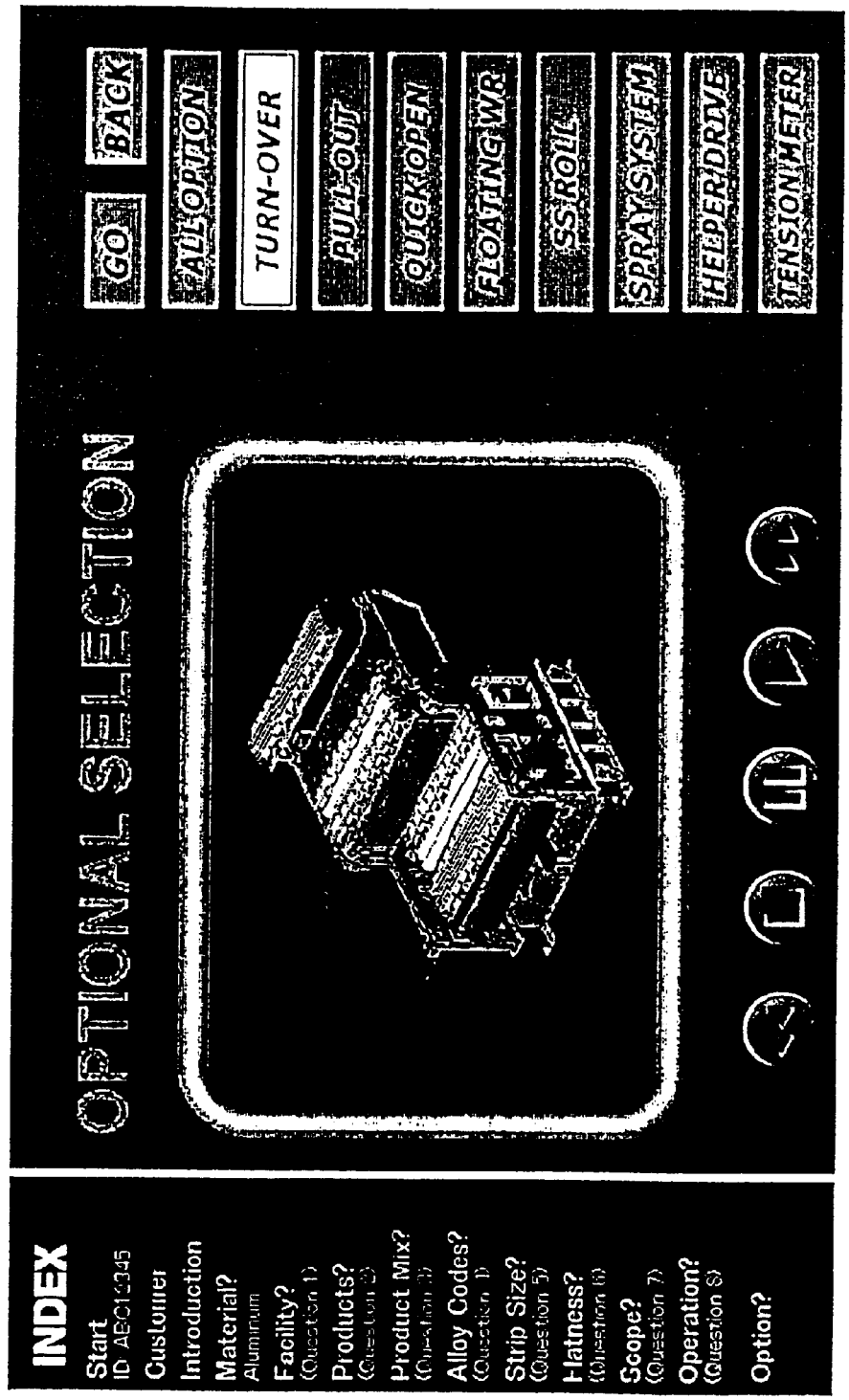
FIG. 24 shows an optional components introduction and selection screen displayed by the estimation and designing supporting apparatus according to the first embodiment of the present invention.

The CPU 21 then displays an optional components selection screen as shown in FIG. 23 by using of the image data prepared in S170 (FIG. 6; step S181). The CPU 21 thereafter waits for an instruction to be inputted by an operator (step S182). When instructed to display any of optional components introduction and selection screen (step S182; display), the CPU 21 displays the instructed optional components introduction and selection screen (step S183). In this step S183, for example, an optional components introduction and selection screen as shown in FIG. 24 is displayed.

The CPU 21 then gives parameters relating to the operater's instructed optional components to a component's cost calculation module and starts up the component's cost calculation module (calling a program for component's cost calculation) to calculate the costs of the additional components (step S184). The component's costs calculation module started up in step S184 utilizes a component model cost database 33 stored in the CD-ROM 28 for the calculation. The component model's cost database 33 stores the corresponding relationship between the standard measurements and the standard cost of each component, as a part of the database 33 is shown in FIG. 25. The CPU 21 calculates the costs of the additional components based on the measurements acquired by the estimation and designing and the data in the component model cost database 33.

The CPU 21 thereafter waits for input of an instruction of whether or not the optional components displayed on the optional components introduction and selection screen is added to the estimation (step S185). When instructed to add the displayed optional components (step S185; add), the CPU 21 returns processing to step S181 after additionally storing the displayed optional components in the estimation and designing condition/result database 35 (step S186). On the other hand, when instructed not to add the displayed optional components (step S185; not to add), the CPU 21 simply returns the processing to step S181.

On the contrary, when instructed of the completion of selection of the optional components in step S182 (step S182; complete), the CPU 21 calculates cost of overall tension leveller including the additional components (step S187). Specifically, the CPU 21 gives the parameter for each component and the above-mentioned estimative classification value to the above-mentioned component's cost calculation module, starts up the component's cost calculation module and makes the module refer to the above-mentioned component model's cost database 33, and thus makes it calculate the total costs. The CPU 21 then displays the external appearance of the tension leveller including the additional components (step S188) and prepares and stores specification data by starting up the specification preparation module (step S189).

The CPU 21 thereafter waits for an instruction to be inputted by an operator (step S190). When instructed to do again (step S190; return). The CPU 21 executes again the processing from a step corresponding to any one of the INDEX items in the left side of the screen. It is noted that, in this case, all the data in the estimation and designing condition/result database 35 relating to the estimation number at the time are renewed, although that is not clearly shown in the flow chart, all the data in the estimation and designing condition/result database 35 relating to the estimation number at the time are renewed in this case. On the other hand, when instructed to finish the processing (step S190; finish), the CPU 21 finishes all, the processing and returns the processing to the start. When other instructions is inputted (step S190; print, etc.), the CPU 21 executes the instructed processing such as the change of the displayed contents, printing of the specification, and printing of the external appearance images (step S191).

As described above, the estimation and designing supporting apparatus according to the present invention can estimate an installation on the the ground only with setting a specification through the interactive manner. Further, since default values are displayed on the screen through which a specification which can be input, estimation and designing can be conducted without a lot of operations for inputting data. For this reason, if the apparatus according to the present invention is used, requirements of a customer can be met precisely and quickly and, as a result, high evaluation as an supplier of the tension leveller.

Second Embodiment

Figure 26:
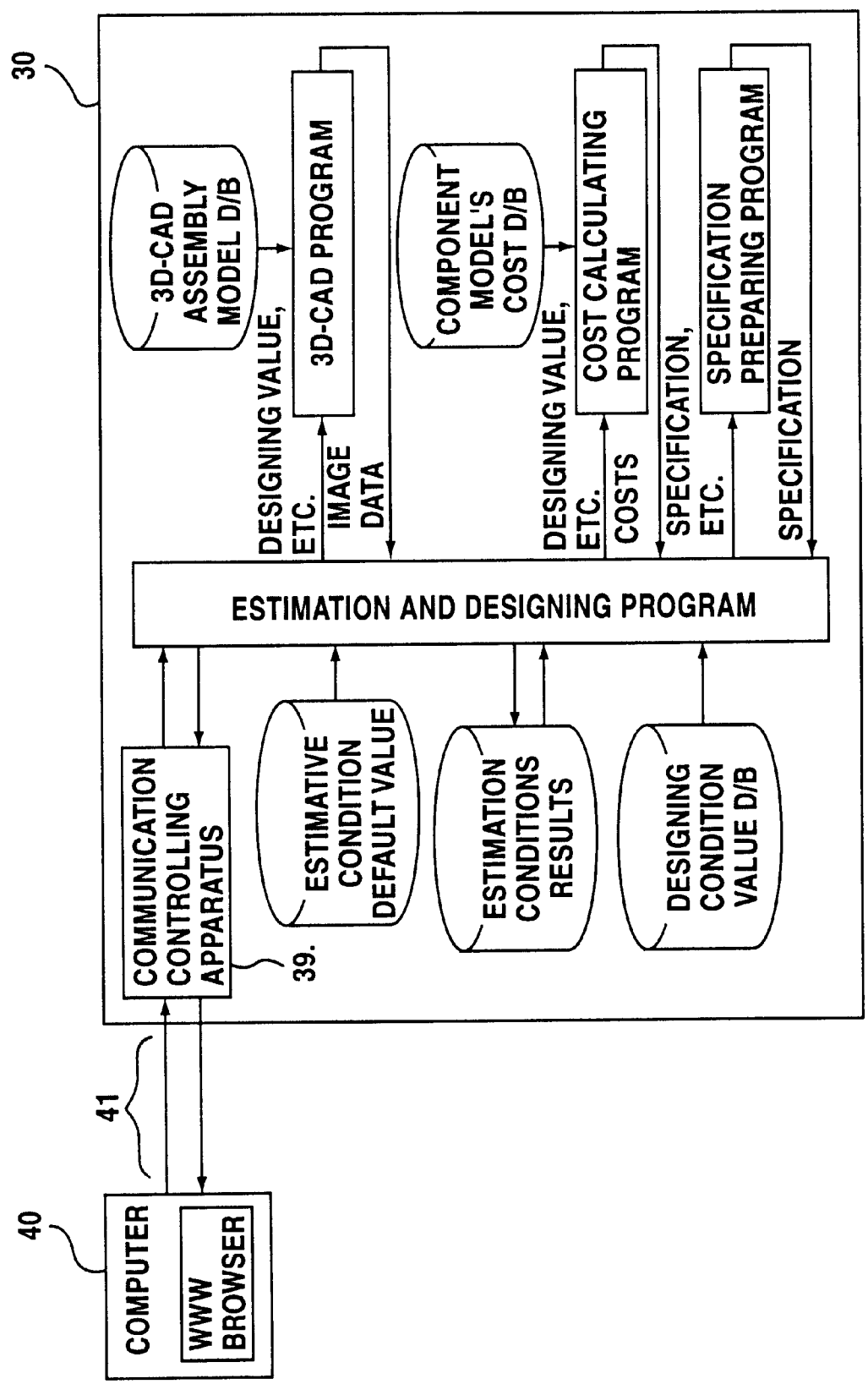
FIG. 26 is a functional block diagram showing the structure of the estimation and designing supporting apparatus according to the first embodiment of the present invention.

An estimation and designing supporting apparatus according to a second embodiment of the present invention is a modification of that according to the first embodiment of the invention and can be realized by running a predetermined program by a computer in the same way as the apparatus according to the first embodiment. Further, the basic process is the same as that of the apparatus according to the first embodiment. However, as schematically shown in FIG. 26, the estimation and designing supporting apparatus 30 according to the second embodiment can be used in the state where it is connected to a computer 40 provided with a WWW browser via a communication line 41.

For this reason, the estimation and designing supporting apparatus 30 is provided with a communication control device 39 controlling information transmission via the communication line 41. Further, the apparatus 30 is installed with an estimation and designing program which makes unillustrated CPU of the apparatus 30 execute processing for the WWW browser equivalent to the processing which the CPU 21 in the estimation and designing supporting apparatus 10 according to the first embodiment conducts for the inputting section 11 and the outputting section 12. In other words, a transmission request from the computer 40 is treated in the same way as a signal from the inputting section 11 (that is, instruction by an operator) in according to the estimation and designing program in the estimation and designing supporting apparatus 30. Then, processing utilizing various types of databases stored in a storing device provided in the apparatus is conducted based on the instruction and an HTML source code corresponding to the data obtained as a result of the processing, which corresponds to the data transferred to the outputting section 12 in the estimation and designing supporting apparatus 10, is transferred to the computer 40 via the communication line 41.

Thus, the estimation and designing supporting apparatus 30 according to the second embodiment of the invention can operate the computer 40 connected thereto through the Internet in the same way as the estimation and designing supporting apparatus 10 according to the first embodiment of the invention. Therefore, if the estimation and designing supporting apparatus 30 is connected to the Internet, business negotiations can be promoted using a customer's computer.

VARIATION

The estimation and designing supporting apparatus according to the first and second embodiments of the invention can be modified in various forms. For example, a supplying medium containing a program for operating a computer as the estimation and designing supporting apparatus is not necessarily a CD-ROM but may be an MO(Magnet-Optical) disc or a floppy disc. In addition, the estimation and designing supporting apparatus according to the first embodiment is an apparatus having a projector so that estimation and designing can be conducted in front of a multitude of people. However, the apparatus may be structured as the one having a monitor only. Further, the estimation and designing supporting apparatus according to the present invention may be structured for an installation other than a tension leveller.

If the estimation and designing supporting apparatus according to the present invention is used, since the estimation of an installation corresponding to a specification can be quickly obtained in the place where the specification is determined, a requirement of a customer can be met precisely and quickly.

It is further understood by those skilled in the art that the foregoing description is a preferred embodiment of the disclosed matter and that various changes and modifications may be made in the invention without departing from the spirit and scope thereof.

What is claimed is:

1. An estimation and designing supporting apparatus for estimating an installation which requires designing according to a specification and which is to be manufactured by combining various types of components, comprising:

specification acquiring means for acquiring a specification of the installation to be manufactured;

designing means for determining the types and sizes of components required for manufacturing said installation meeting the specification acquired by the specification acquiring means;

estimating means for calculating the costs required for manufacturing said installation based on the types and sizes of components determined by said designing means;

cost outputting means for outputting the costs calculated by the estimating means; and a default data information storing means for storing default data information defining, for at least one of plural specification items, correspondence between a content of said at least one specification item and default contents of other specification items, wherein said specification acquiring means sets default contents of a specification item based on already acquired contents of another item in accordance with the default data information stored in said default data information storing means, and adjusts the set default contents in accordance with operation by an operator.

2. The estimation and designing supporting apparatus according to claim 1, further comprising:

standard cost data storing means for storing standard cost data used by the estimating means for calculating the each cost of the plurality of components based on the size thereof, wherein said estimating means calculates the costs required for manufacturing said installation based on the types and sizes of components determined by said designing means and the standard cost data stored in said standard cost data storing means.

3. The estimation and designing according supporting apparatus to claim 1, further comprising:

converting means for converting data of a specification item into data that can be directly used by said designing means each time the data of the specification item is acquired by said specification acquiring means, wherein said designing means determines the types and sizes of components required for manufacturing said installation meeting the specification acquired by said specification acquiring means based on the data for designing converted by said converting means.

4. The apparatus for supporting an estimation and designing according to claim 1, wherein:

said specification acquiring means acquires a specification from a terminal connected thereto via a communication line; and said cost outputting means outputs the costs calculated by said estimating means to said terminal.

5. The estimation and designing supporting apparatus according to claim 1, further comprising:

shape data storing means for storing shape data representing three dimensional shapes of each of said plurality of components;

drawing means for drawing a three dimensional external appearance of said installation based on the types and sizes of components determined by said designing means and the shape data stored in said storing means; and external appearance outputting means for outputting the external appearance drawn by the drawing means.

6. The estimation and designing supporting apparatus according to claim 5, wherein:

said specification acquiring means acquires a specification from a terminal connected thereto via a communication line;

said cost outputting means outputs the costs calculated by said estimating means to said terminal; and said external appearance outputting means outputs the external appearance drawn by said drawing means to said terminal.

* * * * *